April 2, 1968

W. K. BRADSHAW 3,375,937

CARGO HANDLING APPARATUS

Filed April 24, 1967

INVENTOR

William K. Bradshaw

BY Shoemaker and Mattare

ATTORNEYS

April 2, 1968  W. K. BRADSHAW  3,375,937
CARGO HANDLING APPARATUS
Filed April 24, 1967  8 Sheets-Sheet 2
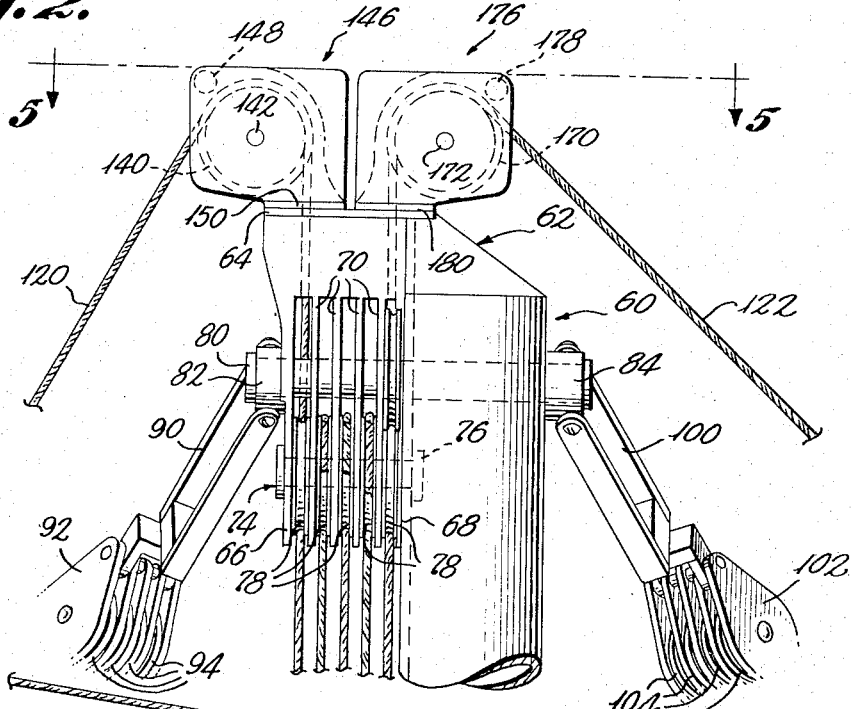
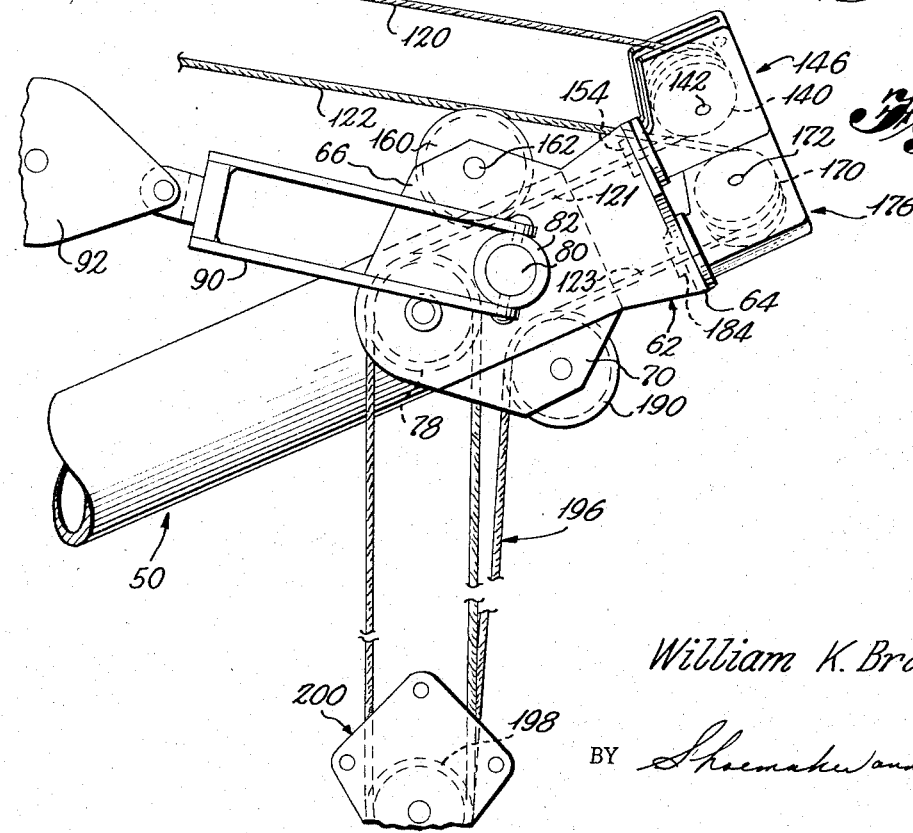
INVENTOR
William K. Bradshaw
BY Shoemaker and Mattare
ATTORNEYS April 2, 1968  W. K. BRADSHAW  3,375,937
CARGO HANDLING APPARATUS
Filed April 24, 1967  8 Sheets-Sheet 3

INVENTOR
William K. Bradshaw
BY Shoemaker and Mattare
ATTORNEYS

April 2, 1968 W. K. BRADSHAW 3,375,937
CARGO HANDLING APPARATUS
Filed April 24, 1967 8 Sheets-Sheet 4
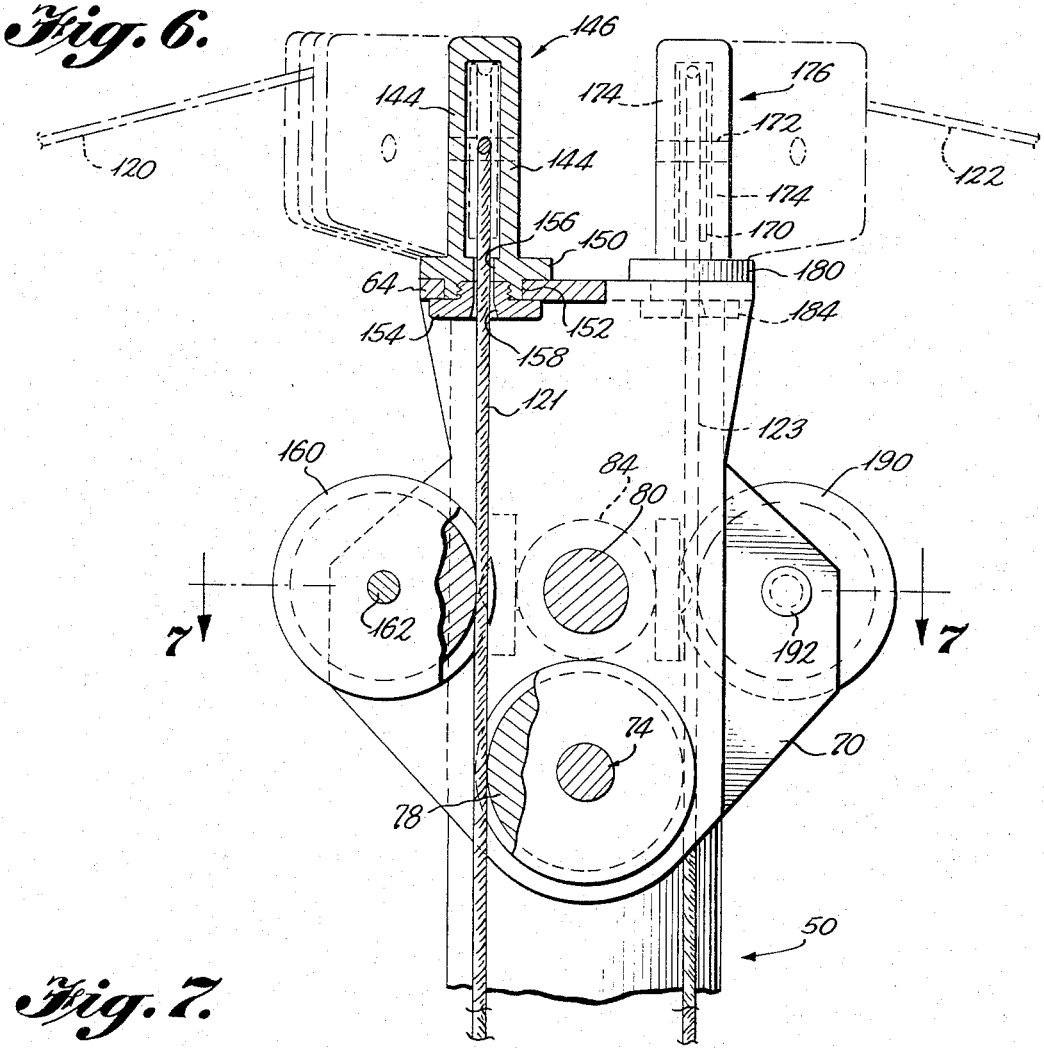
Fig. 6.
Fig. 7.
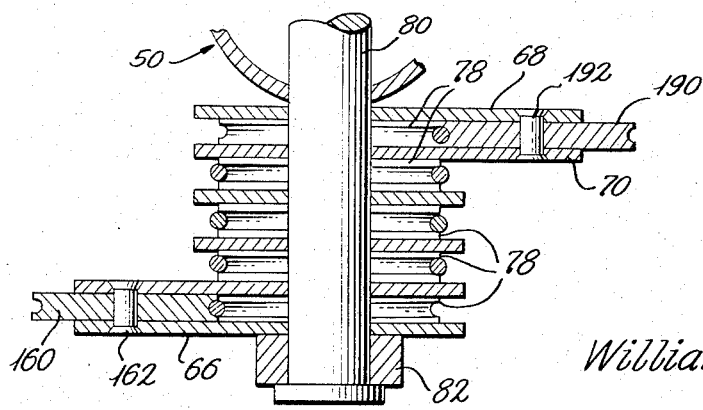
INVENTOR
William K. Bradshaw
BY Shoemaker and Mattare
ATTORNEYS

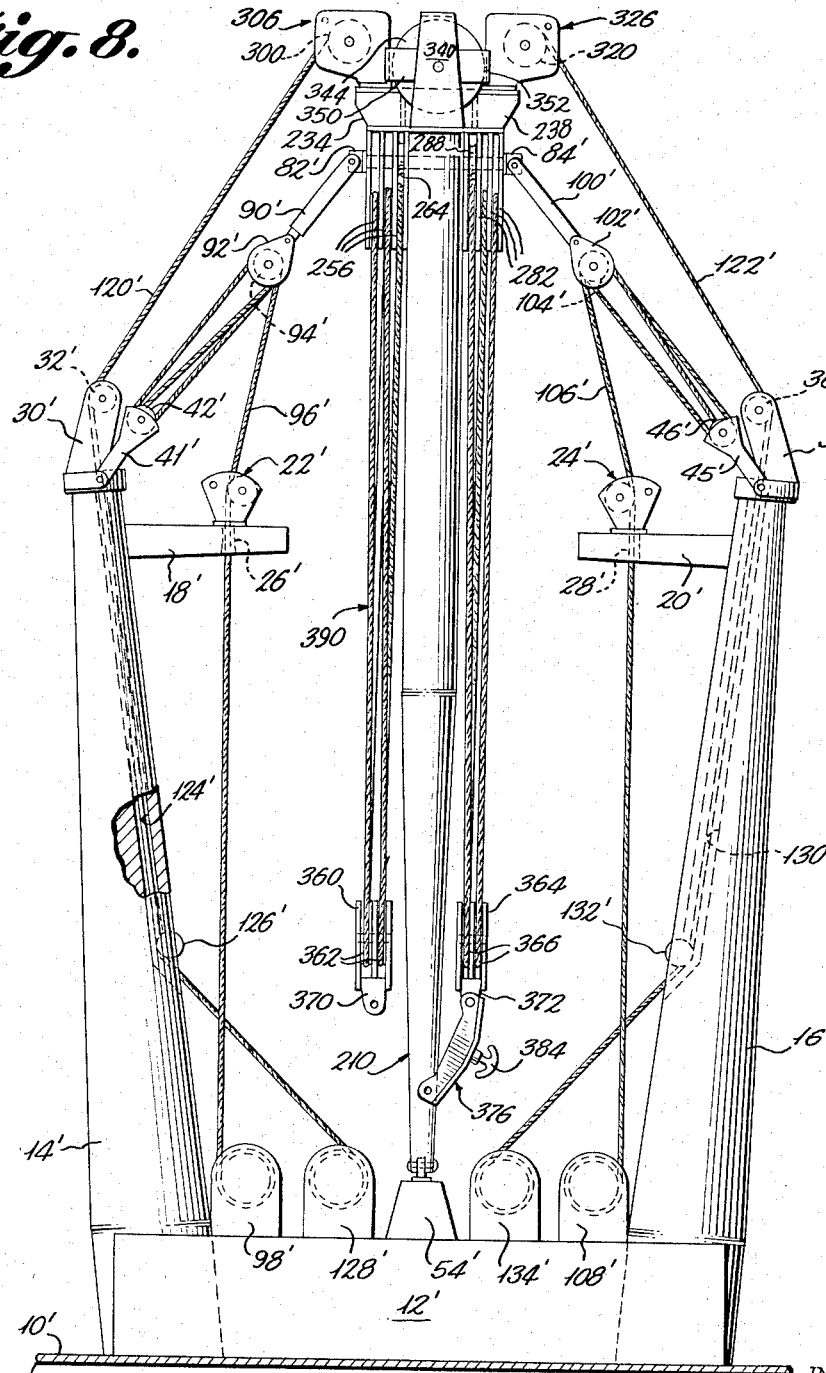

April 2, 1968
W. K. BRADSHAW
3,375,937
CARGO HANDLING APPARATUS
Filed April 24, 1967
8 Sheets-Sheet 6
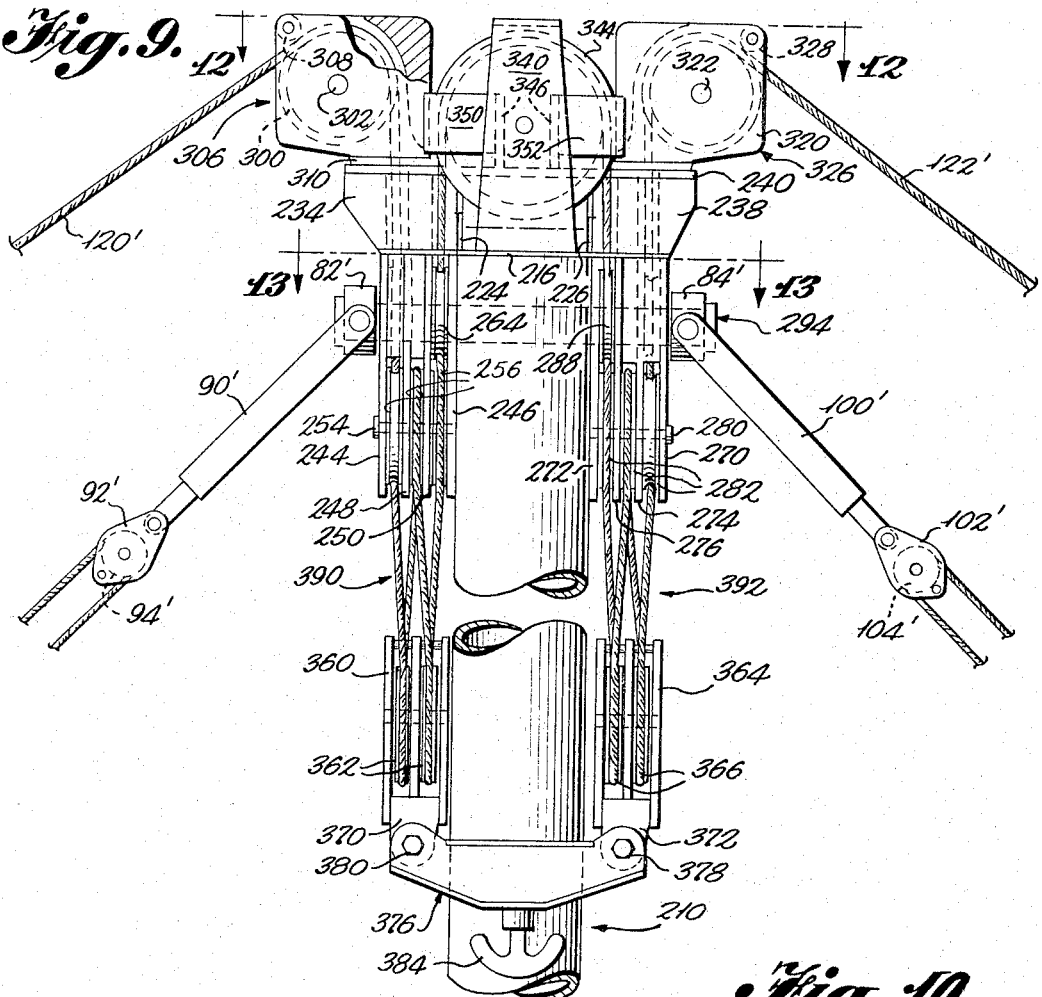
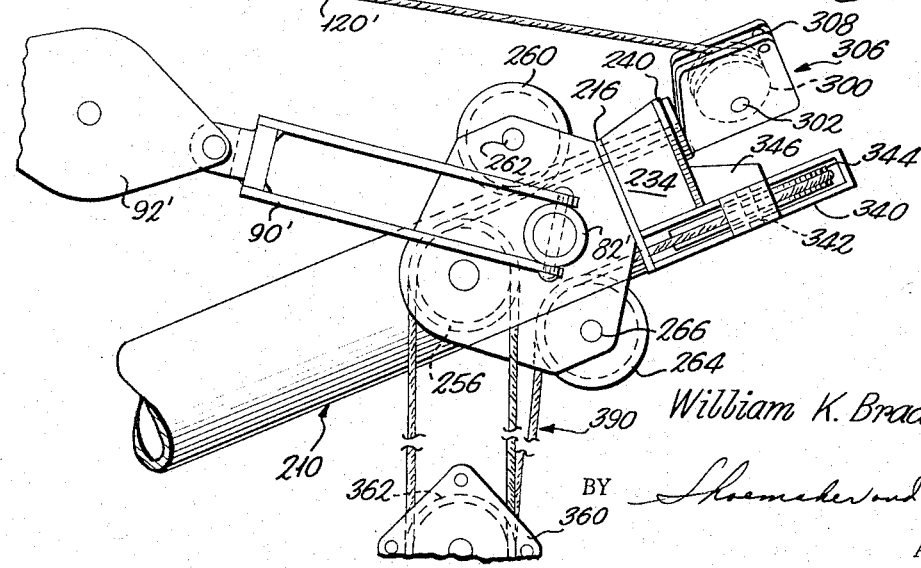
INVENTOR
William K. Bradshaw
BY Shoemaker and Mattare
ATTORNEYS

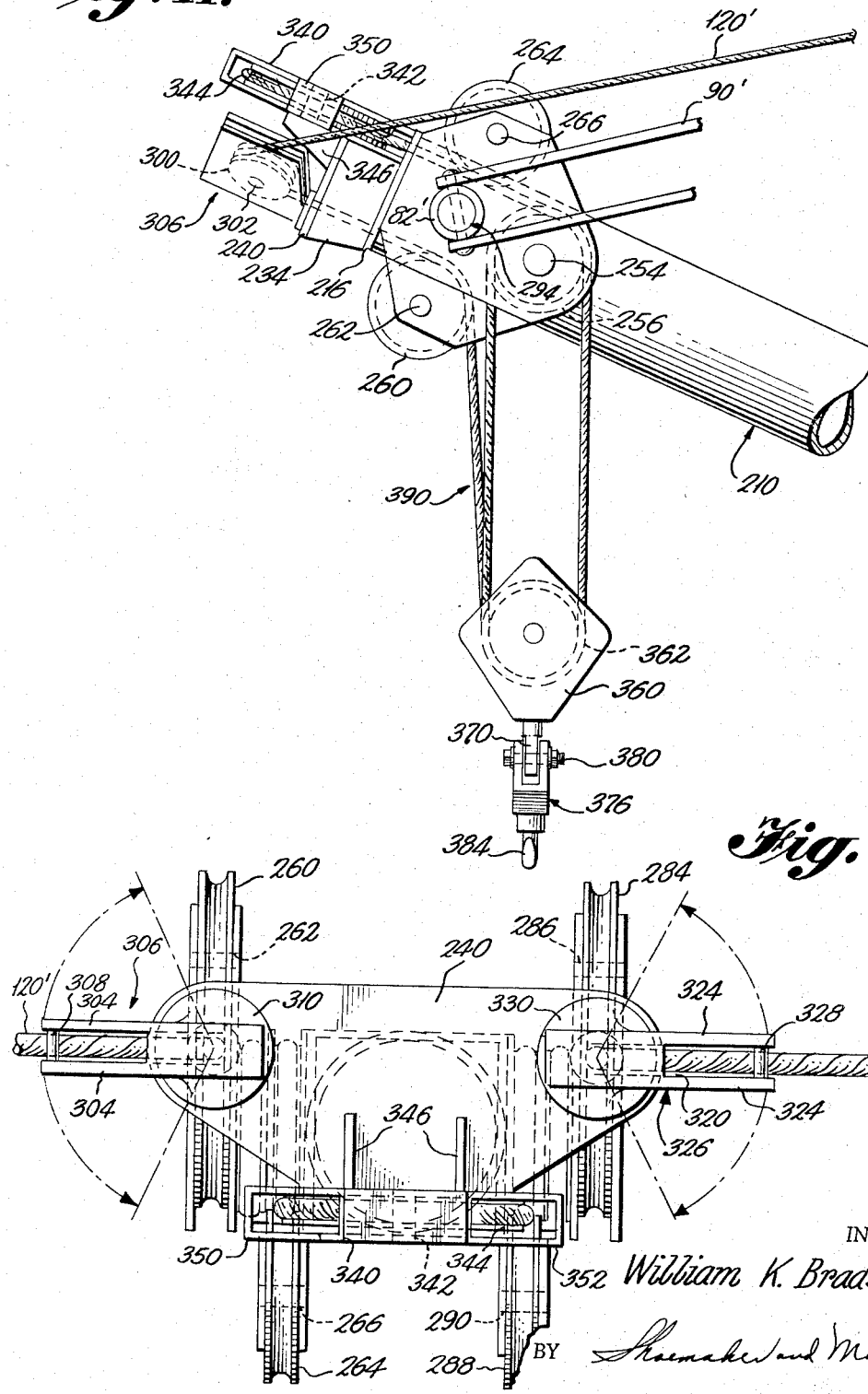

April 2, 1968
W. K. BRADSHAW
3,375,937
CARGO HANDLING APPARATUS
Filed April 24, 1967
8 Sheets-Sheet 6
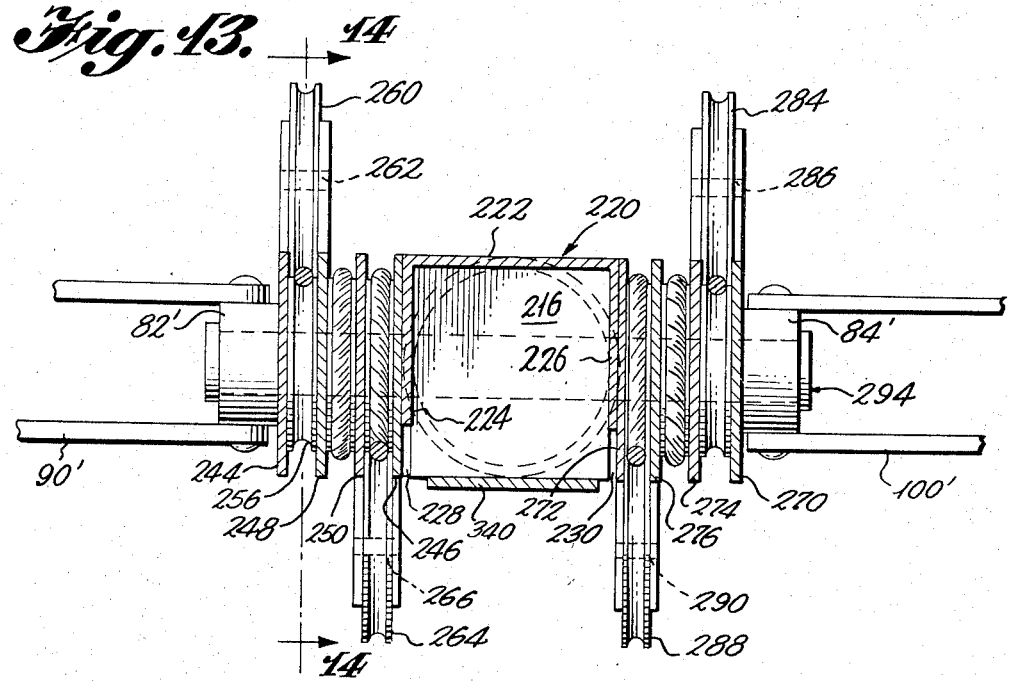
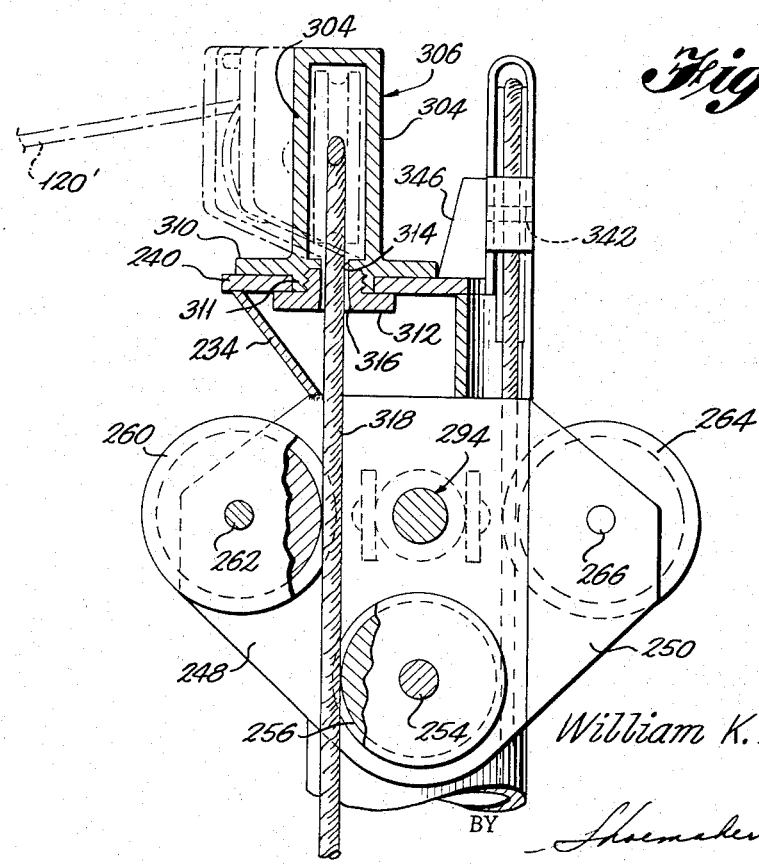
INVENTOR
William K. Bradshaw
BY
ATTORNEYS

United States Patent Office 3,375,937
Patented Apr. 2, 1968

3,375,937
CARGO HANDLING APPARATUS
William K. Bradshaw, Hampton, Va., assignor to Newport News Shipbuilding and Dry Dock Company, Newport News, Va., a corporation of Virginia
Filed Apr. 24, 1967, Ser. No. 633,106
14 Claims. (Cl. 212—3)

ABSTRACT OF THE DISCLOSURE

A boom including a head portion and a heel portion is mounted for substantially universal movement at the heel portion thereof and is adapted to swing between a pair of spaced king posts. Topping lift means is connected between the king posts and the head portion of the boom for maneuvering the boom. In a first modification, an upper purchase sheave assembly means is supported at the head portion of the boom and includes a plurality of sheaves which are mounted for rotation about a common axis which is fixed with respect to the boom. A cargo fall cable is reeved around the sheaves of the upper purchase sheave assembly means and a plurality of rotatable sheaves mounted in a lower purchase block means which supports a cargo hook. A pair of fairlead sheaves are pivotally mounted at the uppermost end of the boom, the hoisting leads of the cargo fall cable passing over these fairlead sheaves. Guide sheaves are positioned intermediate the fairlead sheaves and the sheaves of the upper purchase sheave assembly means. These guide sheaves are positioned to receive a portion of the cargo fall cable passing over an associated fairlead sheave. The fairlead sheaves as well as the guide sheaves are all offset on one side of the boom as is the upper purchase sheave assembly means. The guide sheaves are also offset fore and aft of the boom respectively to guide a portion of the cargo fall cable when the boom operates either fore or aft of the king posts.

In a modified form of the invention, a second upper purchase sheave assembly means similar to the first-mentioned upper purchase sheave assembly means is provided at the opposite side of the boom to provide a symmetrical arrangement. A second lower purchase block means is also provided, and in this case, a connector means is connected between the lower purchase block means and supports the cargo hook. The connector means is detachable from at least one of the lower purchase block means to permit the lower purchase block means to be swung through. The second upper purchase sheave assembly means has a pair of guide sheaves operatively associated therewith in the same manner as the first-mentioned pair of guide sheaves. In this modification, one of the fairlead sheaves is operatively associated with the first upper purchase sheave assembly means, and the other fairlead sheave is operatively associated with the second upper purchase sheave assembly means. A cross-over sheave means is provided, this cross-over sheave means being mounted for rotation about an axis which extends substantially normally to the axis of rotation of the sheaves of the two upper purchase sheave assembly means. The cargo fall cable is reeved over this cross-over sheave means so that a common cargo fall cable is employed throughout the apparatus.

Background of the invention

The present invention relates to a heavy lift boom as used on shipboard of the type wherein the boom swings through a pair of spaced king posts for operation with more than one hatch.

Various arrangements have been provided in the prior art to enable a heavy lift boom on shipboard to operate with a hatch disposed either fore or aft of the boom. In order to successfully enable the boom to so operate, it is necessary to provide some sort of an arrangement whereby the boom can be swung through a plane defined by the spaced king posts.

United States Patent No. 3,110,403 is directed to such an arrangement wherein a cargo fall support means is movably mounted at the head portion of the boom to enable the cargo fall means to be positioned at opposite sides of the boom for operation both fore and aft of the heel of the boom. This type of arrangement employs a single hoisting lead thereby seriously limiting the speed of operation of the apparatus, and further requires the utilization of relatively large expensive winch mechanism.

When employing two hoisting leads with cargo handling apparatus as illustrated in this aforementioned U.S. patent, the hoisting leads would not clear the boom and each other and would tend to become fouled and twisted during swinging of the boom into its various operative positions.

An additional disadvantage of the arrangement as shown in the aforementioned U.S. patent is the fact that the hoisting winch is necessarily positioned remote from the heel of the boom since a certain amount of hoisting lead is required between the winch and the first adjacent fairlead over which the hoisting lead is reeved.

United States Patent No. 2,914,193 also discloses a heavy lift boom adapted to be swung between a pair of king posts. This arrangement employs a pair of hoisting leads, but in order to swing the boom through between the king posts, it is necessary to raise the lower purchase block into snug engagement with the upper purchase block and then to cause these engaged purchase blocks to tumble through between the spaced arms at the upper end of the boom. This operation is of course time consuming and further causes the boom and the upper and lower purchase blocks to be heavily loaded when swinging through between the king posts. A further disadvantage when utilizing such an arrangement is the fact that it is usually necessary to remove the cargo hook from the lower purchase block means before swinging the boom through between the king posts as discussed above.

Another disadvantageous feature of these prior art arrangements is the fact that the upper purchase block means must be so mounted that it can swing in some manner about the upper end of the boom. This of course requires a mounting structure of greater size and complexity, and the mass of the swinging components is increased by an upper purchase block means mounted in this manner.

Summary of the invention

In the arrangement of the present invention, a pair of hoisting leads are provided in the cargo fall cable so as to enable the apparatus to be operated at maximum speed. Additionally, smaller winches may be employed resulting in a lower initial cost, and further presenting the advantage of providing a reserve winch in case one of the winches should be disabled.

The hoisting leads are reeved over first and second fairlead sleeves and further cooperate with first and second guide sheaves so that the cargo fall cable automatically moves into position as the boom is moved about so that the hoisting leads of the cargo fall cable as well as the remaining portions thereof do not become fouled regardless of the position of the boom, thereby enabling the boom to be moved into any desired operative relationship and permitting the cargo fall means to be effectively operated.

The hoisting leads extend down through the king posts thereby enabling the hoisting winches to be disposed closely adjacent to the heel of the boom which is a very desirable arrangement.

In the arrangement of the present invention, the upper purchase sheave assembly means is fixed so that no swinging movement whatsoever of the upper purchase sheave assembly means is required when the boom is swung through between the king posts. Accordingly, the size and complexity of the mounting structure may be substantially reduced, and the size and mass of the swinging components is also much less than with the arrangements discussed hereinabove as employed in the prior art.

An object of the present invention is to provide new and novel cargo handling apparatus adapted to operate at maximum speed with the use of relatively small winches, and wherein the cargo fall cable and the hoisting leads thereof will not foul with the boom or one another or any of the adjacent components during operation of the apparatus, and further wherein no swinging movement of the upper purchase sheave assembly means is required.

Brief description of the drawings

FIG. 2 is an enlarged view of the head portion of the boom and the components associated therewith;

FIG. 3 is a side view of the head portion of the boom illustrating it inclined in a position to operate with a hatch on one side of the king posts;

FIG. 6 is an enlarged sectional view taken substantially along line 6—6 of FIG. 5 looking in the direction of the arrows;

FIG. 7 is a sectional view taken substantially along line 7—7 of FIG. 6 looking in the direction of the arrows;

FIG. 8 is a front view partly broken away illustrating a modified form of the invention;

FIG. 9 is an enlarged view of the head portion of the boom shown in FIG. 8;

FIG. 10 is a view illustrating the head portion of the boom inclined to one side of the king posts;

FIG. 11 is a view similar to FIG. 10 illustrating the boom inclined to the opposite side of the king posts;

FIG. 12 is a view taken substantially along line 12—12 of FIG. 9 looking in the direction of the arrows;

FIG. 13 is a sectional view taken substantially along line 13—13 of FIG. 9 looking in the direction of the arrows; and FIG. 14 is a sectional view taken substantially along line 14—14 of FIG. 13 looking in the direction of the arrows.

Description of the preferred embodiments

Figure 1:
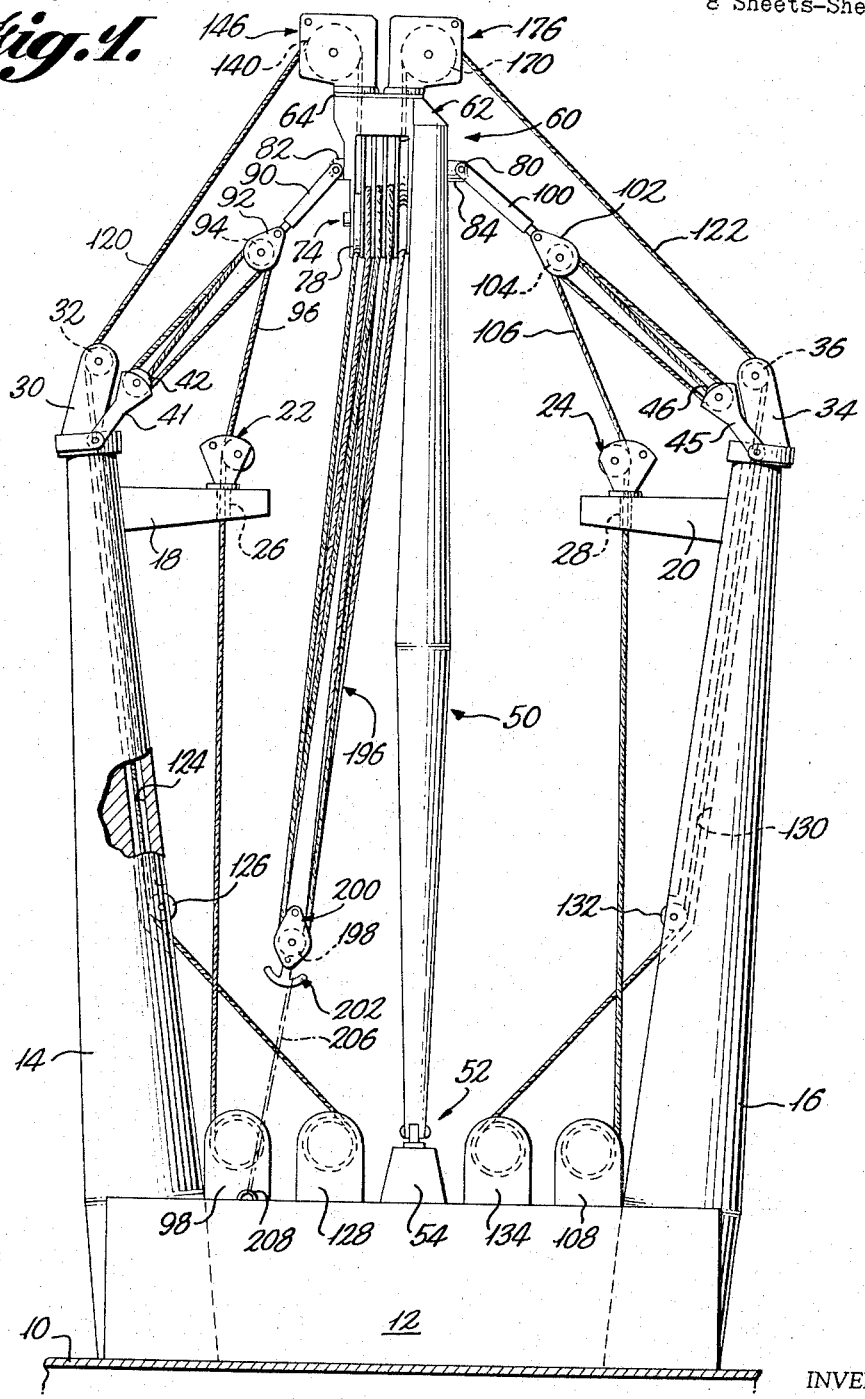
FIG. 1 is a front view partly broken away illustrating the cargo handling apparatus of a first form of the invention with the boom in a substantially vertical position.

Referring now to the drawings wherein like reference characters designate corresponding parts throughout the several views, the upper deck of a ship is indicated by reference number 10, a winch housing 12 being supported on this upper deck. It should be understood that the usual ship's gear for loading and discharging cargo may also be mounted on or adjacent to the winch house, but such conventional gear has been eliminated for the sake of simplicity in order that the heavy lift boom mechanism may be more readily understood.

A pair of king posts 14 and 16 extend upwardly from the winch house, the king posts being spaced apart athwartships and being of a symmetrical tapered configuration. As seen most clearly in FIG. 1, a pair of laterally inwardly projecting brackets 18 and 20 are supported by king posts 14 and 16 respectively. A pair of swivelly mounted topping lift lead blocks 22 and 24 are supported on brackets 18 and 20, the brackets having vertical holes 26 and 28 formed therethrough respectively for receiving the topping lift cables hereinafter described.

A head 30 is rotatably mounted at the upper end of king post 14 and rotatably supports a sheave 32. A block 41 is pivotally connected to head 30 and rotatably supports topping lift sheaves 42. In a similar manner, a head 34 is rotatably mounted at the upper end of king post 16 and rotatably supports a sheave 36. A block 45 is pivotally connected to head 34 and rotatably supports topping lift sheaves 46.

A heavy lift boom is indicated generally by reference numeral 50, this boom including a heel portion indicated generally by reference numeral 52 which is mounted for substantially universal movement within a boom pedestal 54. The construction of the heel portion of the boom as well as the boom pedestal arrangement may be substantially the same as that shown in U.S. Patent 3,110,403.

The boom includes a head portion indicated generally by reference numeral 60. A fitting indicated generally by reference numeral 62 is rigidly attached to the upper end or head portion of the boom as by welding or the like so as to be rigidly secured in position thereon. This fitting 62 includes a top plate or wall portion 64. As seen most clearly in FIG. 2, a pair of spaced depending plates 66 and 68 are supported by the fitting, and a further plurality of spaced plates 70, shown as being four in number, are also supported by the fitting between the plates 66 and 68 so as to define a plurality of spaces for receiving the cargo fall cable and the sheaves as hereinafter described.

A headed pin 74 extends through aligned holes provided in plates 66–70 inclusive, the inner end of this pin being suitably threaded for receiving a nut or similar means 76 for retaining the pin in operative position. The pin has a substantially cylindrical outer surface which serves to rotatably support the sheaves 78, there being five sheaves in the illustrated example. These sheaves 78 define a plurality of sheaves all mounted about a common axis of rotation which is fixed with respect to the boom, and further define the upper purchase sheave assembly means of the present invention.

A further elongated pin 80 is supported through aligned holes provided in the head portion of the boom and the various plates 66–70. The opposite ends of pin 80 extend on opposite sides of the apparatus as seen most clearly in FIG. 2 and are provided with enlarged end portions so as to rotatably support swivel members 82 and 84 at opposite ends of the pin. The arrangement is such that the swivel members are free to turn about pin 80, but are restrained from sliding axially therefrom.

A link means 90 is pivotally interconnected with swivel member 82, and is also pivotally interconnected with a block 92 supporting topping lift sheaves 94. A topping lift cable 96 is reeved over the topping lift sheaves 42 and 94 and passes downwardly through the topping lift lead block 22 to the topping winch 98.

A further link means 100 is pivotally interconnected with swivel member 84, and is also pivotally connected with a block 102 which rotatably supports topping lift sheaves 104. A further topping lift cable 106 is reeved over the topping lift sheaves 46 and 104, and passes downwardly through the topping lift lead block 24 to the topping winch 108.

The cargo fall cable includes a pair of hoisting leads 120 and 122, the lead 120 passing over sheave 32 extending downwardly through a passage 124 formed in king post 14 and over a sheave 126 to a hoisting or cargo winch 128. The other hoisting lead 122 passes over sheave 36, extends downwardly through a passage 130 in the king post 16 and over a sheave 132 to a hoisting or cargo winch 134.

Figure 5:
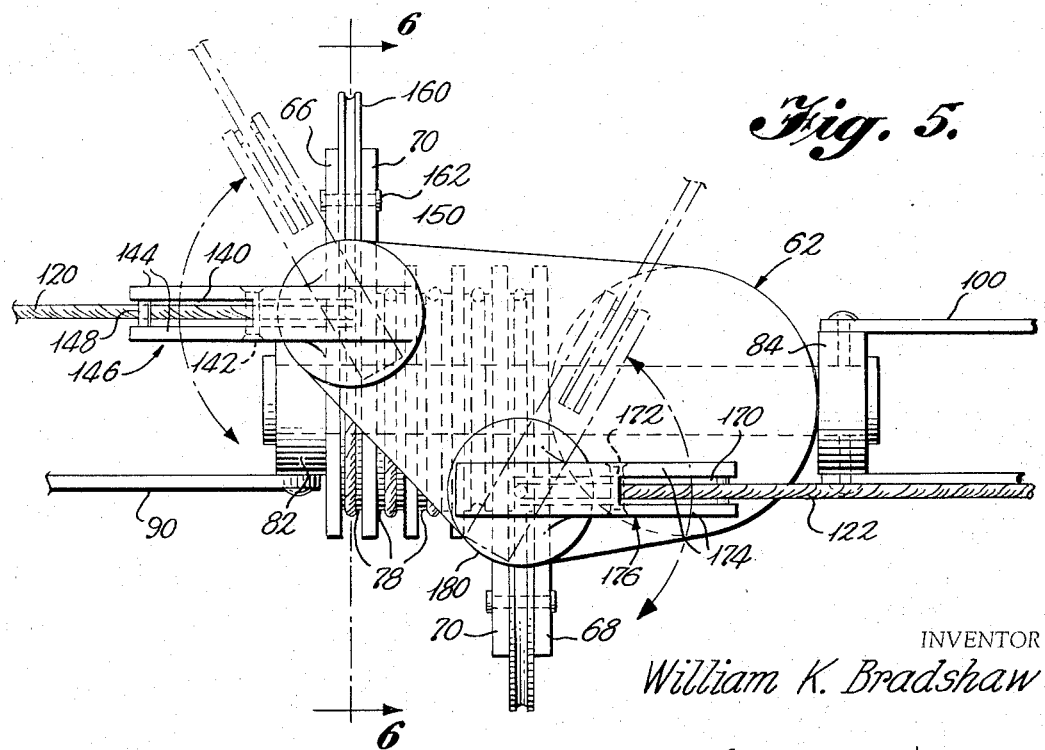
FIG. 5 is a view taken substantially along line 5—5 of FIG. 2 looking in the direction of the arrows.

Referring now particularly to FIGS. 2, 5 and 6, hoisting lead 120 passes over a first fairlead sheave 140 rotatably supported on a shaft 142 which is disposed between substantially parallel wall portions 144 of a bracket indicated generally by reference numeral 146. A spacer 148 is connected between the wall portions 144 for rigidifying the structure and maintaining the wall portions in proper spaced relationship. The lower portion of bracket 146 is provided with an outwardly extending flange 150 which rests upon the upper surface of plate 64 previously described. Bracket 146 includes a downwardly extending substantially cylindrical portion 152 fitted within a corresponding hole provided in plate 64 so as to mount the bracket member for swivelling movement on the plate. The undersurface of the bracket 146 is provided with a threaded hole which receives the threaded shank of a member 154 which is adapted to be threaded into the operative position shown in FIG. 6 for holding the bracket 146 in operative position, but allowing it to swivel freely with respect to the plate 64. The lower portion of the bracket member and member 154 have aligned bores 156 and 158 formed therethrough adapted to permit the depending portion 121 of hoisting lead 120 to pass freely therethrough.

A guide sheave 160 is disposed beneath fairlead sheave 140 and is rotatably supported by a shaft 162. This shaft is supported between outwardly extending portions of plate 66 and the adjacent plate 70 whereby guide sheave 160 is offset aft of the boom when the boom is in a vertical position.

Referring again to FIGS. 2, 5 and 6, hoisting lead 122 passes over a fairlead sheave 170 rotatably supported on a shaft 172. Shaft 172 is supported between opposite substantially parallel wall portions 174 of a bracket indicated generally by reference numeral 176. A spacer 178 is connected between the wall portions 174 for rigidifying the structure and maintaining the wall portions in proper spaced relationship.

Bracket 176 is provided with a flange 180, the over-all construction of bracket 176 being substantially identical with that of bracket 146. A member 184 of the same construction as member 154 is threaded within a socket provided in bracket 176 for holding the bracket in operative position on the plate 64 so that it is free to swivel with respect thereto. The bracket 176 and member 184 are provided with suitable bores formed therethrough for receiving the downwardly directed portion 123 of hoisting lead 122.

A guide sheave 190 is disposed beneath fairlead sheave 170 and is rotatably mounted upon a shaft 192 supported by outwardly extending portions of plates 68 and 70. The arrangement is such that guide sheave 190 is offset forwardly of the boom when the boom is in a vertical position, as seen for example in FIG. 6.

As seen mostly clearly in FIG. 1, the hoisting leads 120 and 122 form part of the cargo fall cable 196 which is reeved about the sheaves 78 of the upper purchase sheave assembly means, the cargo fall cable also being reeved about the sheaves 198 of a lower purchase block means 200 which pivotally supports a cargo hook 202.

It will be noted that the upper purchase sheave assembly means is supported at the head portion of the boom and is in fixed relationship to the boom. The upper purchase sheave assembly means is disposed at one side of the boom in offset lateral relationship from the longitudinal axis of the boom. Each of the fairlead sheave means is pivotally mounted about an axis which is offset from the longitudinal axis of the boom on the same side as the upper purchase sheave assembly means. The two guide sheaves 160 and 190 are also offset on the same side of the longitudinal axis of the boom, guide sheave 160 being offset aft of the boom, and guide sheave 190 being offset forward of the boom.

Referring now to FIG. 3 of the drawings, when the boom is inclined forward of the associated king posts, the components will move into the operative position illustrated in this figure. It will be noted that the hoisting lead 120 will pass over the fairlead sheave 140 and thence over one of the sheaves 78 of the upper purchase sheave assembly means, and thence downwardly to the lower purchase block means. On the other hand, the hoisting lead 122 will pass over fairlead sheave 170, thence downwardly and over guide sheave 190 to the lower purchase block means. In this manner, the cargo fall cable is automatically properly positioned regardless of the inclination of the boom, the guide sheaves insuring that the cargo fall cable is properly guided and suspended from the head of the boom.

Figure 4:
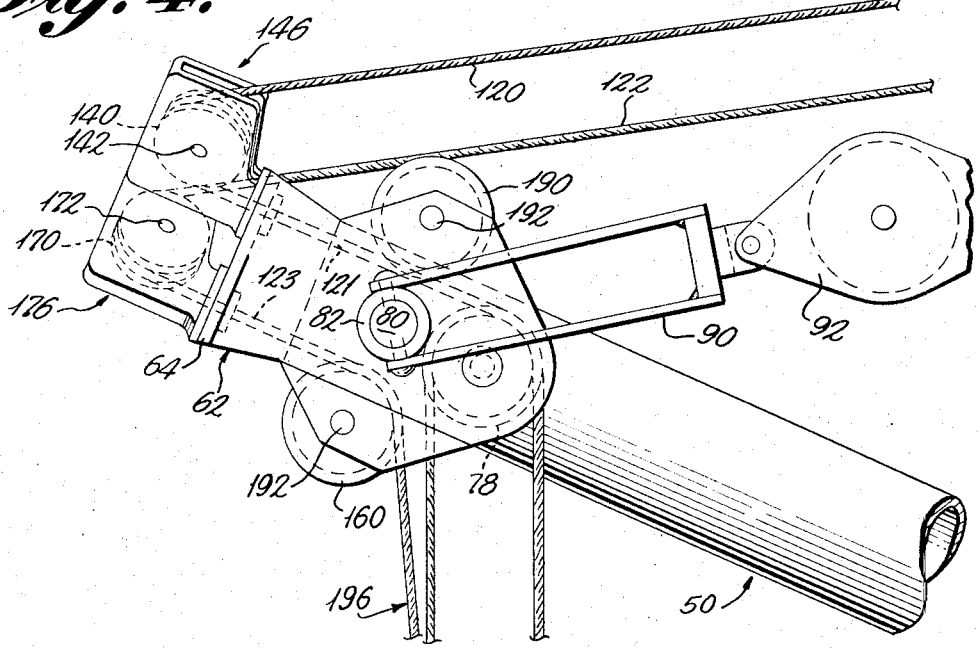
FIG. 4 is a view similar to FIG. 3 illustrating the boom inclined in the opposite direction to operate on the opposite side of the king posts.

Turning now to FIG. 4 of the drawings, the boom is illustrated as being inclined aft of the king posts. In this position, hoisting lead 120 passes over fairlead sheave 140, and thence over one of the sheaves 78 of the upper purchase sheave assembly means to the lower purchase block means. The hoisting lead 122 passes over the fairlead sheave 170, and thence over the guide sheave 160 to the lower purchase block means. It will be noted that in this position, the guide sheave 160 is operatively engaged with the cargo fall cable at the head of the boom, whereas when the apparatus is in the position shown in FIG. 3, the other guide sheave 190 operatively engages the cargo fall cable.

The interrelationship and arrangement of the components is such that the various members will automatically move into the operative relationship shown without causing any fouling of the cables and components. The upper purchase sheave assembly means is fixed with respect to the boom, and accordingly only the lower purchase block means is swung about during movement of the boom.

When swinging the apparatus through between the king posts, the boom may be moved into the vertical position shown in FIG. 1, and the lower purchase block means need only be raised high enough to clear the winches and cables connected therewith. It is of course not necessary in this particular arrangement to raise the lower purchase block means to a point adjacent to the upper purchase sheave assembly means as has been necessary with certain prior art arrangements. The cargo hook may be attached to a pendant 206 passing through a suitable guide means such as a padeye 208 secured to the upper surface of the winch housing to guide the movement of the lower purchase block means and to hold this block means as well as the cargo fall cable away from the boom. On the other hand, the boom may simply be swung through between the king posts, and the various components of the apparatus will automatically swing into operative position at the other side of the king posts.

Referring now to FIGS. 8–14 inclusive, a modified form of the invention is illustrated. Similar parts have been given the same reference numerals primed, and it will be noted that the mast and winch structure as well as the topping lift structure and the hoisting leads are substantially the same as in the previous modification. The heel portion of the boom in this form of the invention is also the same construction as that previously described, and the difference from the previously described embodiment lies in the arrangement of a pair of upper purchase sheave assembly means and a pair of lower purchase block means disposed symmetrically on opposite sides of the boom in contrast to the first disclosed arrangement wherein the upper purchase sheave assembly and lower purchase block means are both offset on one side of the boom.

As seen most clearly in FIGS. 9 and 13, the head portion of the boom in this form of the invention has a plate 216 rigidly secured thereto as by welding or the like. A support framework indicated generally by reference numeral 220 as seen in FIG. 13 includes a rear wall portion 222 and a pair of side wall portions 224 and 226 which are cutout at the forward portions thereof as indicated by reference numerals 228 and 230 to provide clearance with the cross-over sheave means hereinafter described. This support framework is rigidly secured to plate 216 as by welding or the like.

A first fitting 234 as seen in FIG. 9 is secured to wall 224 and extends laterally therefrom, a fitting 238 being secured to wall 226 and extending laterally therefrom. These fittings 234 and 238 are suitably secured as by welding. A top plate 240 is supported on the upper portions of the support framework 220 and fittings 234 and 238.

Outer and inner plates 244 and 246 are secured at the upper edges thereof to the undersurface of fitting 234, and a pair of spaced plates 248 and 250 are provided intermediate plates 244 and 246. All of these plates are rigidly secured to fitting 234 in depending relationship therefrom. A suitable pin member 254 extends through aligned holes in plates 244–250, and three upper purchase sheaves 256 are rotatably supported upon the shank portion of pin 254. The sheaves 256 form one portion of the upper purchase sheave assembly means of this form of the invention.

As seen most clearly in FIG. 13, a first guide sheave 260 is rotatably supported upon a shaft 262, shaft 262 being supported between outwardly extending portions of plates 244 and 248. Another guide sheave 264 is rotatably supported upon shaft 266, shaft 266 being supported between outwardly extending portions of plates 246 and 250. It will accordingly be noted that guide sheave 260 is offset to one side of the boom and aft of the boom, while guide sheave 264 is offset to the same side of the boom and forward of the boom when in the vertical position.

Referring again to FIG. 9, outer and inner plates 270 and 272 are fixed at their upper edges to the undersurface of fitting 238, and a pair of spaced plates 274 and 276 are similarly supported from fitting 238 intermediate plates 270 and 272.

A pin member 280 extends through suitable aligned holes provided in plates 270–276, the shank of pin 280 serving to rotatably support three upper purchase block sheaves 282. These sheaves provide the second portion of the upper purchase sheave assembly means of this form of the invention.

As seen in FIG. 13, a guide sheave 284 is rotatably supported upon a shaft 286, this shaft being supported between outwardly extending portions of plates 270 and 274. Another guide sheave 288 is rotatably supported upon a shaft 290, this shaft being supported between outwardly extending portions of plates 272 and 276. It will be noted that each of these latter two guide sheaves are offset to the opposite side of the boom from the guide sheaves 260 and 264, guide sheave 284 being offset aft of the boom, and guide sheave 288 being offset forward of the boom.

In this form of the invention, a pin means 294 having enlargements at the opposite ends thereof extends through aligned holes provided in plates 244–250 as well as plates 270–276, the pin means also extending through holes provided in the head portion of the boom, the pin means being fixed with respect to these components. The swivel members 82' and 84' are adapted to swivel about pin means 294, but are retained against axial removal therefrom.

A fairlead sheave 300 is rotatably supported by a shaft 302, shaft 302 being supported at the opposite ends thereof by the spaced wall portions 304 of a bracket 306. A spacer 308 is connected between the wall portions 304 for rigidifying the structure and maintaining the wall portions in proper spaced relationship.

As seen most clearly in FIG. 14, an outwardly extending flange 310 is provided at the lower portion of bracket 306 and is adapted to rest upon the upper surface of plate 240 previously described. A substantially cylindrical projection 311 extends from the bottom of bracket 306 and is received within a suitable hole provided in plate 240 whereby the bracket is supported for swivelling movement on the plate. A threaded socket is provided within portion 311, and a member 312 substantially identical with member 154 previously described has a threaded projection which threads up within the threaded socket in portion 311 for retaining the bracket 306 in operative position as illustrated.

The lower portion of bracket 306 has a bore 314 formed therethrough, and member 312 has an aligned bore 316 formed therethrough whereby the downwardly extending portion 318 of hoisting lead 120' is adapted to move freely through such bores.

A further fairlead sheave 320 is rotatably supported by a shaft 322, this shaft being supported between substantially parallel wall portions 324 of a bracket indicated generally by reference numeral 326. A spacer 328 is connected between the wall portions 324 for rigidifying the structure and maintaining the wall portions in proper spaced relationship.

An outwardly extending flange 330 is provided at the lower portion of the bracket 326, and the remaining structure of the bracket as well as a member corresponding to member 312 is identical with the bracket 306 whereby bracket 326 is swively supported on the top plate 240.

A support member 340 is generally U-shaped in cross sectional configuration, the opposite legs thereof being secured to the plate 310. As seen most clearly for example in FIGS. 10 and 12, a shaft 342 has the opposite ends thereof supported by the opposite legs of U-shaped member 340, and a cross-over sheave means 344 is rotatably supported on shaft 342.

A pair of gusset members 346 are rigidly connected between one of the legs of member 340 and the plate 240 for rigidifying the structure. Two U-shaped strap members 350 and 352 are secured to the legs of member 340 at opposite sides thereof for enclosing the cross-over sheave means and for additionally reinforcing the cross-over sheave means support structure.

As seen most clearly in FIG. 9, the lower purchase block means of this form of the invention includes a first lower purchase block 360 rotatably supporting a pair of sheaves 362, and a second lower purchase block 364 rotatably supports a plurality of sheaves 366.

Portions 370 and 372 rigidly affixed to blocks 360 and 364 extend downwardly therefrom and are interconnected by connector means indicated generally by reference numeral 376. This connector means may comprise a rigid member having holes at opposite ends thereof for receiving suitable connector means 378 and 380 such as nut and bolt assemblies which fit through holes in portions 370 and 372 for interconnecting the lower purchase blocks 360 and 364. A cargo hook 384 is suitably movably connected with connector means 376.

The hoisting lead 120' passes over fairlead sheave 300, and thence downwardly whereupon an intermediate portion 390 of the cargo fall cable is reeved about the sheaves 256 and 362 of the upper purchase sheave assembly and lower purchase block means to the left side of the boom as seen in FIG. 9. The cargo fall cable is then reeved upwardly over the cross-over sheave means 344, and thence downwardly whereupon a further intermediate portion 392 of the cargo fall cable is reeved about the sheaves 282 and 366 of the upper purchase sheave assembly and lower purchase block means at the right side of the boom as seen in FIG. 9. The cargo fall cable then is reeved over fairlead sheave 320 to provide the second hoisting lead 122'.

Referring to FIG. 10, when the boom is inclined forwardly of the king posts in the position illustrated, the hoisting lead 120' extends over fairlead sheave 300, thence downwardly over the upper purchase sheaves 256, and around the lower purchases block sheaves 362, thence upwardly over the guide sheave 264, and then over the cross-over sheave means 344. The cargo fall cable then extends downwardly and passes over the guide sheave 288 and is reeved around the sheaves 282 and 366, and thence upwardly over fairlead sheave 320.

Turning now to FIG. 11 of the drawings, when the boom is inclined rearwardly of the king posts, hoisting lead 120' is reeved over fairlead sheave 300, thence downwardly over guide sheave 260 to the sheaves 362 of the lower purchase block 360. The cargo fall cable is reeved about the sheaves 362 and 256, and then passes up over the cross-over sheave means 344. The cargo fall cable then extends downwardly from cross-over sheave means 344 and is reeved about the sheaves 282 and 366, and then extends upwardly over guide sheave 284 and thence to the fairlead sheave 320.

The various components will assume the proper relationships with respect to one another in an automatic manner as the boom is swung into various operative positions. When it is desired to swing the boom through between the king posts, it is necessary to disconnect the connector means from at least one of the lower purchase block means. As shown in FIG. 8, connector means 376 has been detached from block 360 whereby the two lower purchase blocks may be swung to the opposite side of the boom and the connector means re-attached for operation at the opposite side of the king posts. Here again, it is not necessary to raise the lower purchase block means except to clear the winches and leads thereto on the winch house.

It is apparent from the foregoing that there is provided according to the present invention new and novel cargo handling apparatus employing a pair of hoisting leads which enables the apparatus to be operated at maximum speed with the use of relatively small winches. The fairlead means and the guide means insure that the hoisting leads will not foul with the remainder of the cargo fall cable or any of the remaining components of the apparatus during operation regardless of the relative position of the boom with respect to the king posts of the mast structure. The upper purchase sheave assembly means in each modification is fixed with respect to the boom, thereby reducing the size and complexity of the mounting structure required, and further substantially reducing the size and mass of the components which swing about the boom.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Cargo handling apparatus comprising a mast structure, a boom having a heel portion and a head portion, means mounting the heel portion of the boom for substantially universal movement, the boom being of elongated construction and including a longitudinal axis, topping lift means connected between said mast structure and a head portion of the boom, a pair of fairlead sheaves movably mounted at the uppermost end of said boom, a pair of guide sheaves rotatably supported by said boom and disposed below said fairlead sheaves, each of said guide sheaves being positioned so as to receive a portion of a cargo fall cable, cargo fall means including a cargo fall cable having a pair of hoisting leads each of which passes over one of said fairlead sheaves, upper purchase sheave assembly means supported at the head portion of the boom, said upper purchase sheave assembly means being in fixed relationship to the boom and disposed at one side thereof and offset laterally from said longitudinal axis, said upper purchase sheave assembly means including rotatably mounted sheave means, lower purchase block means for supporting a load and including rotatably mounted sheave means, said lower purchase block means being operatively connected with said upper purchase sheave assembly means by said cargo fall cable which is reeved around said rotatable sheave means on said upper purchase sheave assembly means and said lower purchase block means.

2. Apparatus as defined in claim 1 wherein said upper purchase sheave assembly means includes a plurality of sheaves all mounted about a common axis of rotation, said axis of rotation being fixed with respect to said boom.

3. Apparatus as defined in claim 1 wherein each of said fairlead sheaves is mounted for pivotal movement about an axis, the pivotal axes of said fairlead sheaves both being offset from said longitudinal axis of the boom on the same side thereof as said upper purchase sheave assembly means.

4. Apparatus as defined in claim 1 wherein said guide sheaves are disposed intermediate said fairlead sheaves and the upper purchase sheave assembly means.

5. Apparatus as defined in claim 1 wherein said guide sheaves are both offset on one side of said boom with respect to said longitudinal axis, said guide sheaves also being offset fore and aft of the boom.

6. Apparatus as defined in claim 1 wherein said upper purchase sheave assembly means includes a plurality of sheaves mounted for rotation about a common axis which is disposed in fixed relationship relative to said boom, each of said fairlead sheaves being mounted for pivotal movement about a pivotal axis, said pivotal axes both being offset on the same side of the boom as said upper purchase sheave assembly means, said guide sheaves being mounted for rotation about axes disposed intermediate said fairlead sheaves and the axis of rotation of the sheaves of said upper purchase sheave assembly means.

7. Apparatus as defined in claim 6 wherein said guide sheaves are both offset laterally at one side of the longitudinal axis of the boom and are also offset fore and aft of the boom.

8. Apparatus as defined in claim 1 wherein said upper purchase sheave assembly means includes a plurality of sheaves all mounted about a common axis of rotation, said axis of rotation being fixed with respect to said boom, each of said fairlead sheaves being mounted for pivotal movement about an axis, said pivotal axes both being offset laterallly of the longitudinal axis of the boom on the same side of said upper purchase sheave assembly means, said guide sheaves each being mounted for rotation about an axis disposed intermediate said fairlead sheaves and the axis of rotation of the sheaves of said upper purchase sheave assembly means, said guide sheaves also being both offset laterally of the longitudinal axis of the boom on the same side of said upper purchase sheave assembly means, said guide sheaves being offset fore and aft of the boom.

9. Apparatus as defined in claim 1 including a second upper purchase sheave assembly means supported at the head portion of the boom and being in fixed relationship to the boom, said second upper purchase sheave assembly means being disposed at the opposite side of the boom from said first-mentioned upper purchase sheave assembly means and being offset laterally from the longitudinal axis of the boom, and second lower purchase block means for supporting a load and including rotatably mounted sheave means, said second upper purchase sheave assembly means also including rotatably mounted sheave means, said second lower purchase block means being operatively connected with said second upper purchase sheave assembly means by said cargo fall cable which is also reeved around the rotatable sheave means on said second upper purchase sheave assembly means and said second lower purchase block means.

10. Apparatus as defined in claim 9 including cross-over sheave means mounted for rotation about an axis extending in a direction substantially normal to the axis of rotation of the sheaves of the first and second upper purchase sheave assembly means, said cargo fall cable being reeved over said cross-over sheave means.

11. Apparatus as defined in claim 10 wherein a pair of guide sheaves rotatably supported by said boom are operatively associated with said second upper purchase sheave assembly means, said cross-over sheave means being positioned to receive a portion of a cargo fall cable passing over a guide sheave operatively associated with each of said upper purchase sheave assembly means.

12. Apparatus as defined in claim 9 wherein a pair of guide sheaves rotatably supported by said boom are operatively associated with said second upper purchase sheave assembly means, one of the guide sheaves of said first-mentioned upper purchase sheave assembly means being positioned to receive a portion of a cargo fall cable passing over one of said fairlead sheaves, one of the guide sheaves of the second upper purchase sheave assembly means being position to receive a portion of a cargo fall cable passing over the other of said fairlead sheaves.

13. Apparatus as defined in claim 9 including connector means connected between said first-mentioned lower purchase block means and said second lower purchase block means, said connector means being detachably connected with at least one of said lower purchase block means, and cargo hook means supported by said connector means.

14. Apparatus as defined in claim 9 wherein one of said guide sheaves is positioned to receive a portion of a cargo fall cable passing over one of said fairlead sheaves, a second pair of guide sheaves rotatably supported by said boom and disposed below said fairlead sheaves, said second pair of guide sheaves being operatively associated with said second upper purchase sheave assembly means, one of the guide sheaves of said second pair of guide sheaves being positioned to receive a portion of a cargo fall cable passing over the other of said fairlead sheaves, a cross-over sheave means supported at the head portion of the boom, said cross-over sheave means being mounted for rotation about an axis extending in a direction substantially normal to the axis of rotation of the sheaves of said first-mentioned and second upper purchase sheave assembly means, said cargo fall cable being reeved over said cross-over sheave means, said cross-over sheave means being positioned to receive a cargo fall cable passing over one of the guide sheaves of said first-mentioned and said second pair of guide sheaves, and connector means connected between said first-mentioned lower purchase block means and said second lower purchase block means, said connector means being detachable from at least one of said lower purchase block means, and cargo hook means supported by said connector means.

References Cited

UNITED STATES PATENTS

| | | | |
|---|---|---|---|
| 3,236,390 | 2/1966 | Sprengel | 212—3 |
| 3,286,851 | 11/1966 | Sperg | 212—3 |

EDWARD A. SROKA, *Primary Examiner.*

H. C. HORNSBY, *Assistant Examiner.*